(12) United States Patent
Tamiya

(10) Patent No.: US 8,687,202 B2
(45) Date of Patent: Apr. 1, 2014

(54) DISPLACEMENT DETECTING DEVICE

(75) Inventor: Hideaki Tamiya, Kanagawa (JP)

(73) Assignee: DMG Mori Seiki Co., Ltd. (JP)

( * ) Notice: Subject to any disclaimer, the term of this patent is extended or adjusted under 35 U.S.C. 154(b) by 0 days.

(21) Appl. No.: 13/160,829

(22) Filed: Jun. 15, 2011

(65) Prior Publication Data

US 2011/0310396 A1      Dec. 22, 2011

(30) Foreign Application Priority Data

Jun. 21, 2010  (JP) .................................. 2010-140904

(51) Int. Cl.
*G01B 9/02* (2006.01)
*G01B 11/02* (2006.01)

(52) U.S. Cl.
USPC .......................................... 356/499; 356/494

(58) Field of Classification Search
USPC ......... 356/499, 450, 482, 496, 498, 500, 521, 356/494; 250/231.16, 231.18
See application file for complete search history.

(56) References Cited

U.S. PATENT DOCUMENTS

| 4,979,826 A | 12/1990 | Ishizuka et al. |
| 7,738,112 B2 | 6/2010 | Tamiya |
| 2007/0195334 A1 | 8/2007 | Tamiya |
| 2009/0207422 A1 * | 8/2009 | Loopstra et al. ............... 356/614 |
| 2009/0257066 A1 | 10/2009 | Tamiya et al. |

FOREIGN PATENT DOCUMENTS

| JP | 0231110 A | 2/1990 |
| JP | 0273118 A | 3/1990 |
| JP | 2001183178 A | 7/2001 |
| JP | 2007-218833 A | 8/2007 |
| JP | 2009-257841 A | 11/2009 |

* cited by examiner

*Primary Examiner* — Gregory J Toatley
*Assistant Examiner* — Hina F Ayub
(74) *Attorney, Agent, or Firm* — Cantor Colburn LLP

(57) ABSTRACT

A displacement detecting device has a diffraction grating, grating interferometers, and relative position information output sections. The grating interferometers have a light source, reflectors, a beam splitter, and light receiving sections. The reflectors reflect 1st-order diffracted lights diffracted by the diffraction grating, and cause the reflected 1st-order diffracted lights to be incident at a position substantially identical to the position at which the light from the light source is irradiated. Furthermore, the reflectors cause the 1st-order diffracted lights to be incident on the diffraction grating at an angle different to either the incidence angle of the light from the light source incident on the diffraction grating or the angle at which the 1st-order diffracted lights are transmitted through or reflected by the diffraction grating.

4 Claims, 13 Drawing Sheets

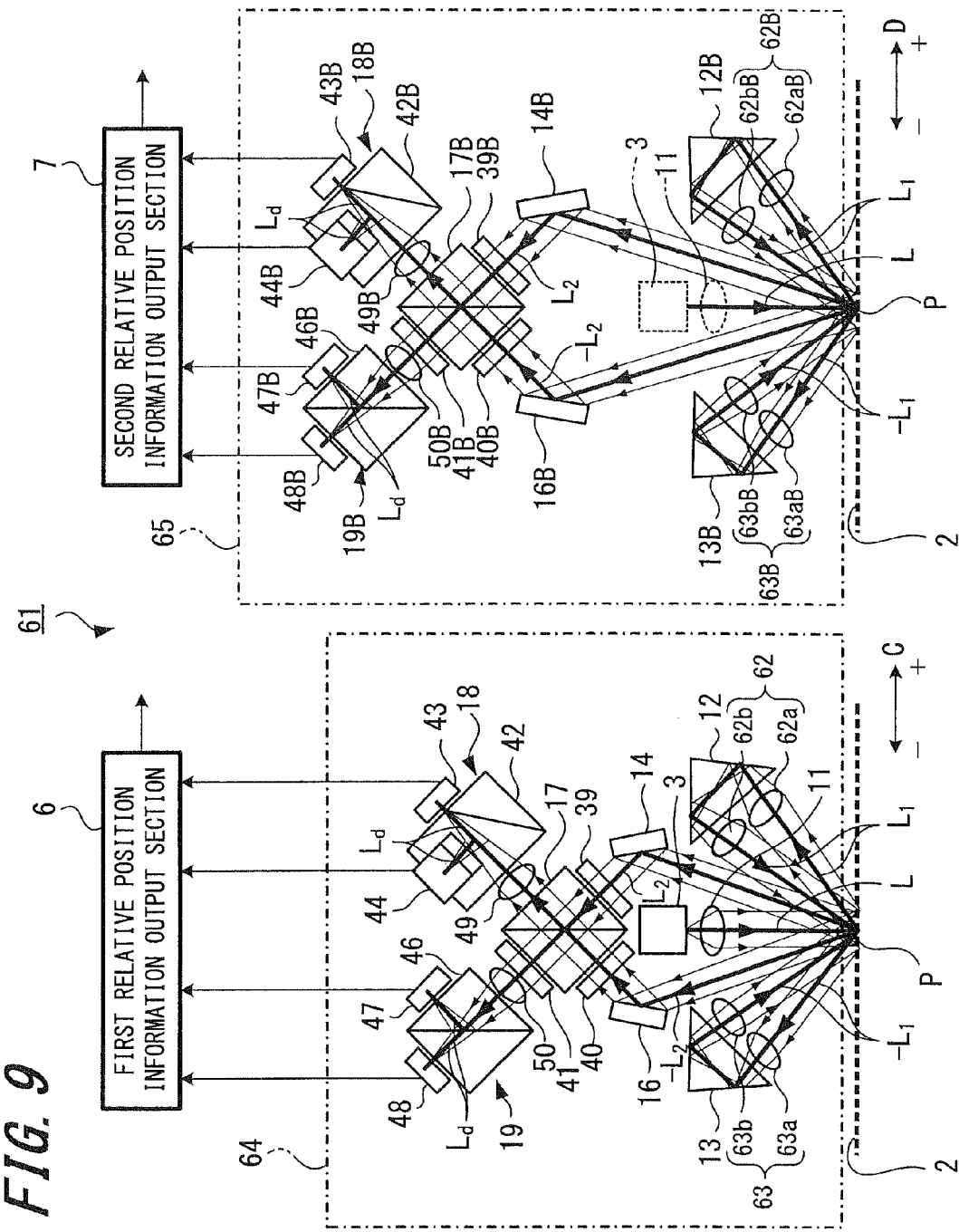

DISPLACEMENT DETECTING DEVICE

CROSS REFERENCES TO RELATED APPLICATIONS

The present invention contains subject matter related to Japanese Patent Application JP 2010-140904 filed in the Japanese Patent Office on Jun. 21, 2010, the entire contents of which being incorporated herein by reference.

BACKGROUND OF THE INVENTION

1. Field of the Invention

The present invention relates to a displacement detecting device which detects the amount of displacement (movement) of a diffraction grating (a scale) by using interference of light.

2. Description of the Related Art

Conventionally, displacement detecting devices having a scale and a detection head are widely used as measuring instruments for accurately measuring linear displacement, rotational displacement and the like. In recent years, displacement detecting devices using the light emitted from a light-emitting diode or laser are used. Further, there is a demand for high-resolution displacement detecting devices capable of measuring a displacement of 1 nm or less.

One of these conventional displacement detecting devices is described in, for example, Japanese Unexamined Patent Application Publication No. 2009-257841. In the displacement detecting device described in Japanese Unexamined Patent Application Publication No. 2009-257841, the light emitted from a light source is split into two beams by a beam splitter, the two beams of light are respectively reflected by two reflectors, and the reflected two beams of light are irradiated at the same position of a diffraction grating.

Further, the two beams of light irradiated on the diffraction grating are diffracted by the diffraction grating to generate two 1st-order diffracted lights. The 1st-order diffracted lights are each reflected by a reflector (such as a mirror) and irradiated on the diffraction grating again along an optical path identical to the optical path through which the light from the light source is irradiated on the diffraction grating. In such a manner, two 2nd-order diffracted lights are generated by being diffracted twice by the diffraction grating.

Next, the two 2nd-order diffracted lights are superimposed on each other by a beam splitter so as to interfere with each other, and the interference light of the two 2nd-order diffracted lights is imaged on a light receiving element. Further, an interference signal is detected by the light receiving element based on the interference light, and movement difference between the two 2nd-order diffracted lights is obtained based on the interference signal so as to detect the amount of the movement of the diffraction gratings.

Further, there is another displacement detecting device described in Japanese Unexamined Patent Application Publication No. 2007-218833, in which two beams of light obtained by splitting the light emitted from a light source by a beam splitter are irradiated at two different positions of a diffraction grating.

SUMMARY OF THE INVENTION

However, in the displacement detecting devices described in Japanese Unexamined Patent Application Publication No. 2009-257841 and Japanese Unexamined Patent Application Publication No. 2007-218833, the output angle of the light emitted from the light source and diffracted by the diffraction grating is equal to the incidence angle of the light reflected by the reflector and incident again on the diffraction grating. Thus, there is a concern that, in the 2nd-order diffracted light diffracted twice by the diffraction grating, unnecessary stray light caused by multiple reflection of each component might be superimposed on the interference light. As a result, noise might be cased due to superimposition of the unnecessary stray light on the interference light, and therefore detection accuracy will be reduced.

Some methods are proposed such as tilting the components, providing a phase plate and/or the like so as to avoid superimposition of the stray light on the interference light. However, if a phase plate and/or the like be provided, the number of components will be increased.

Further, in the art described in Japanese Unexamined Patent Application Publication No. 2007-218833, two beams of light are irradiated at two different positions on the diffraction grating. Thus, if surface accuracy of the surface of the diffraction grating is low, it will cause a change in optical path length of each beam of light. As a result, the change in optical path length will be detected as error.

Furthermore, in an ultra-precise positioning stage having a tilt mechanism of a current semiconductor manufacturing equipment, inspection equipment or the like, a displacement detection accuracy of 1 nm or less with high-speed response is required while maintaining tolerable tilt and clearance as a linear encoder. Thus, it is necessary to eliminate even the aforesaid slight error.

It is an object of the present invention to provide a displacement detecting device in which, when the light emitted from the light source is being diffracted twice by the diffraction grating, the incidence angle and the output angle are different from each other and thereby the interference light and the stray light caused by multiple reflection of each component do not superimposed on each other, so that detection accuracy can be improved.

To solve the aforesaid problems and achieve the object of the present invention, a displacement detecting device according to an aspect of the present invention comprises a substantially plate-like diffraction grating adapted to diffract light, a grating interferometer adapted to irradiate light on the diffraction grating where the irradiated light is diffracted into two beams of light respectively having positive order and negative order, cause the two beams of diffracted light to interfere with each other, and generate an interference signal, and a relative position information output section adapted to detect relative position information of the diffraction grating based on the interference signal generated by the grating interferometer, The grating interferometer includes a light source adapted to irradiate light on the diffraction grating, two reflectors adapted to reflect the two 1st-order diffracted lights diffracted by the diffraction grating, and cause the reflected 1st-order diffracted lights to be incident again on the diffraction grating at a position substantially identical to the point at which the light from the light source is irradiated, a beam splitter adapted to superimpose the two 2nd-order diffracted lights diffracted twice by the diffraction grating on each other, and a receiver adapted to receive the 2nd-order diffracted lights superimposed on each other by the beam splitter to generate an interference signal. The reflectors cause the 1st-order diffracted lights to be incident on the diffraction grating at an angle different from both the incidence angle of the light incident from the light source onto the diffraction grating and the angle at which the 1st-order diffracted lights are transmitted through or reflected by the diffraction grating.

With the displacement detecting device according to the present invention, by the reflectors, the output angle of the 1st-order diffracted lights diffracted by the diffraction grating and the incidence angle of the 1st-order diffracted lights incident again on the diffraction grating are set to be different from each other. Thus, the optical path of the 2nd-order diffracted lights diffracted twice is not parallel to either the optical path of the 1st-order diffracted lights or the optical path of the light incident from the light source onto diffraction grating. As a result, the possibility that the stray light caused by multiple reflection of the components might be superimposed on the interference light can be ruled out, so that interference intensity can be accurately detected.

Furthermore, the 1st-order diffracted lights reflected by the reflectors are incident on the diffraction grating at a position substantially identical to the position at which the light emitted from the light source is incident on the diffraction grating. As a result, it is possible to eliminate the error caused by surface roughness of the diffraction grating, and therefore detection accuracy can be improved.

BRIEF DESCRIPTION OF THE DRAWINGS

FIG. 9 is a side view schematically showing an optical system of a displacement detecting device according to a third embodiment of the present invention;

DETAILED DESCRIPTION OF THE PREFERRED EMBODIMENTS

Figure 1:
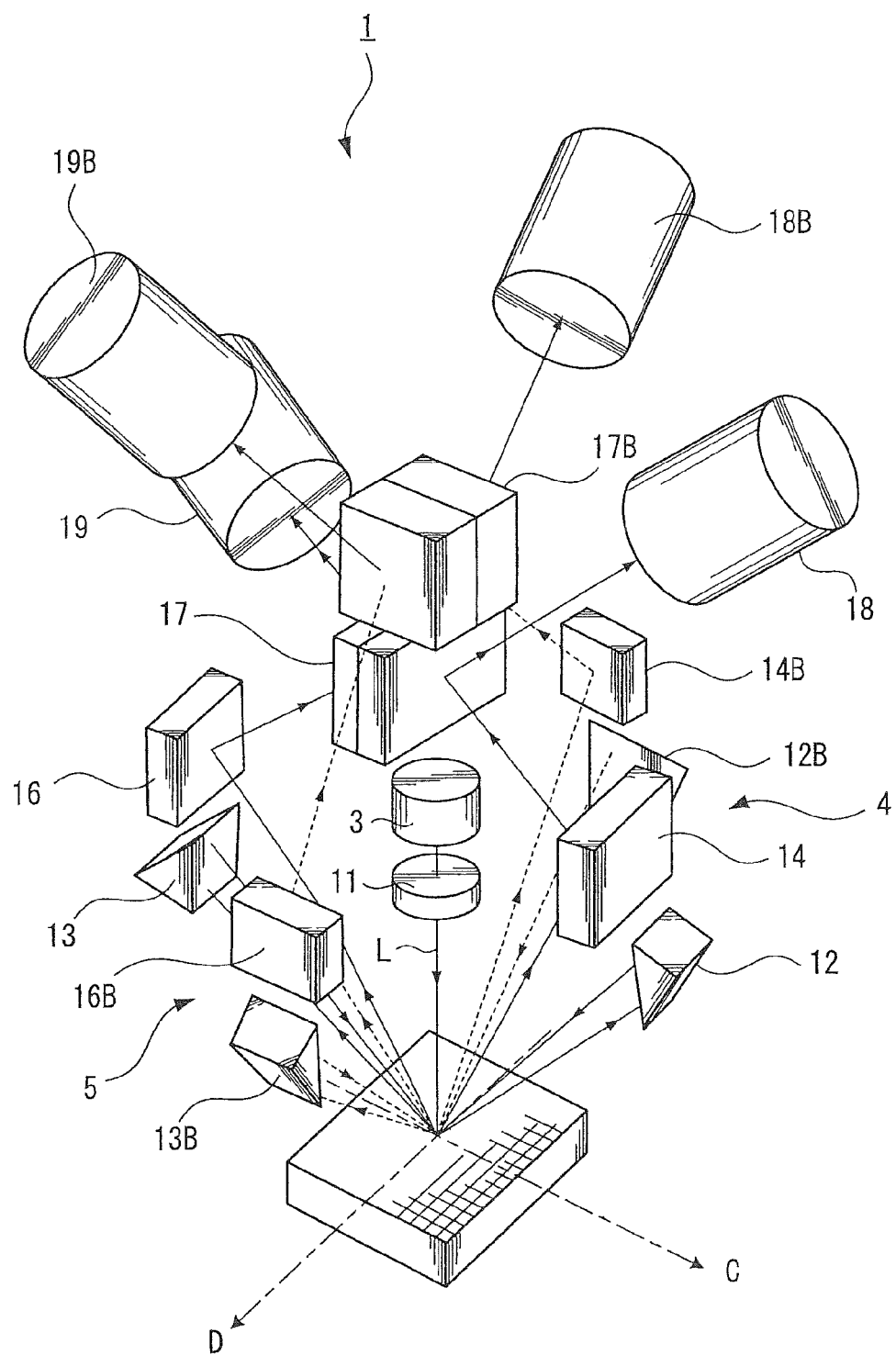
FIG. 1 is a perspective view schematically showing an optical system of a displacement detecting device according to a first embodiment of the present invention.

Preferred embodiments for implementing the displacement detecting device of the present invention will be described below with reference to FIGS. 1 to 15. It should be noted that, in the drawings, like components are denoted by like reference numerals. It should also be noted that the present invention is not limited to these embodiments.

Figure 2:
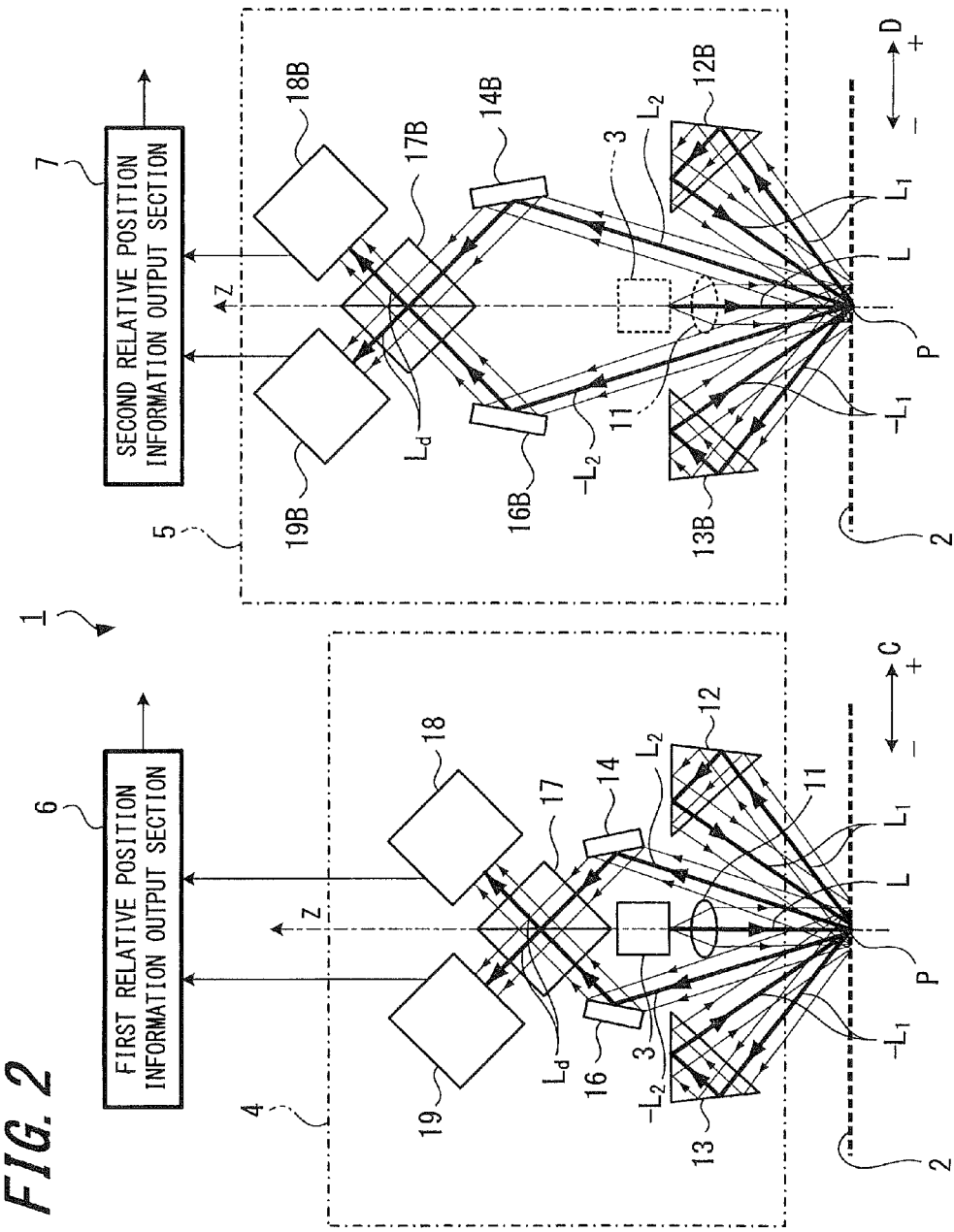
FIG. 2 is a side view schematically showing the optical system of the displacement detecting device according to the first embodiment of the present invention.

The description will be given in the following order.
1. First embodiment
1-1. Configuration example of displacement detecting device
1-1. Operation of displacement detecting device
2. Second embodiment
3. Third embodiment
4. Fourth embodiment
5. Fifth embodiment
6. Sixth embodiment
7. Modifications of diffraction grating 1. First Embodiment First, the configuration of a displacement detecting device according to a first embodiment (referred to as "present embodiment" hereinafter) of the present invention will be described below with reference to FIGS. 1 to 3.
1-1. Configuration Example of Displacement Detecting Device FIG. 1 is a perspective view showing an optical system of a displacement detecting device 1 according to the present embodiment, and FIG. 2 is a side view showing an optical system of the displacement detecting device 1.

The displacement detecting device 1 according to the present embodiment is a displacement detecting device capable of detecting two-dimensional (i.e., planar) displacement using a reflective composite diffraction grating. As shown in FIGS. 1 and 2, the displacement detecting device 1 includes a first grating interferometer 4, a second grating interferometer 5, a first relative position information output section 6, and a second relative position information output section 7 (see FIG. 2), wherein the first grating interferometer 4 and the second grating interferometer 5 share a composite diffraction grating 2 and a light source 3.

Figure 6:
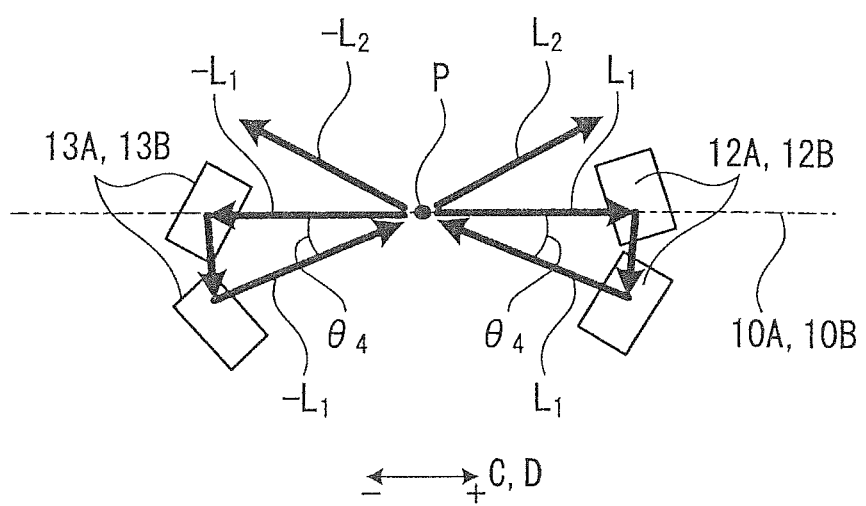
FIG. 6 is an enlarged view showing a modification of the primary portion of the displacement detecting device according to the first embodiment of the present invention viewed from the upper side of the composite diffraction grating.

FIG. 6 is a view showing the composite diffraction grating 2 viewed from the upper side.

Figure 3:
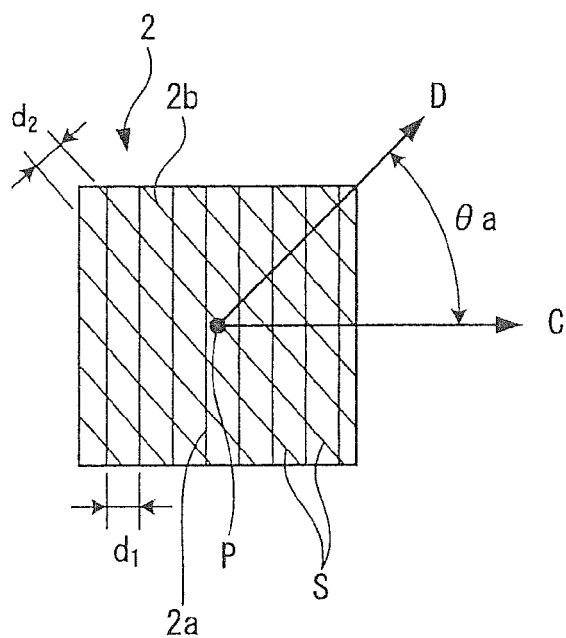
FIG. 3 is a view showing a composite diffraction grating of the displacement detecting device according to the first embodiment of the present invention.

As shown in FIG. 3, the composite diffraction grating 2 has a plate-like shape and includes a first diffraction grating 2a and a second diffraction grating 2b. The first diffraction grating 2a and the second diffraction grating 2b are each configured by forming narrow slits s at equal intervals.

The slits s of the first diffraction grating 2a are formed perpendicular to a first grating vector direction C that is parallel to the surface of the composite diffraction grating 2. The pitch $\Lambda a$ of the first diffraction grating 2a is set to $d_1$. Incidentally, the slits s of the composite diffraction grating 2 is merely an example; the diffraction grating may instead be a reflective diffraction grating having a concavo-convex shaped surface, or a transmissive volume hologram.

The slits s of the second diffraction grating 2b are formed perpendicular to a second grating vector direction D that is parallel to the surface of the composite diffraction grating 2 and inclined with respect to the first grating vector direction C by angle $\theta_a$. The pitch Λb of the second diffraction grating 2b is set to $d_2$. Incidentally, the pitch Λa of the first diffraction grating 2a and the pitch Λb of the second diffraction grating 2b may be equal to or different from each other. Further, the angle $\theta_a$ may be equal to or different from 90 degrees.

Figure 4:
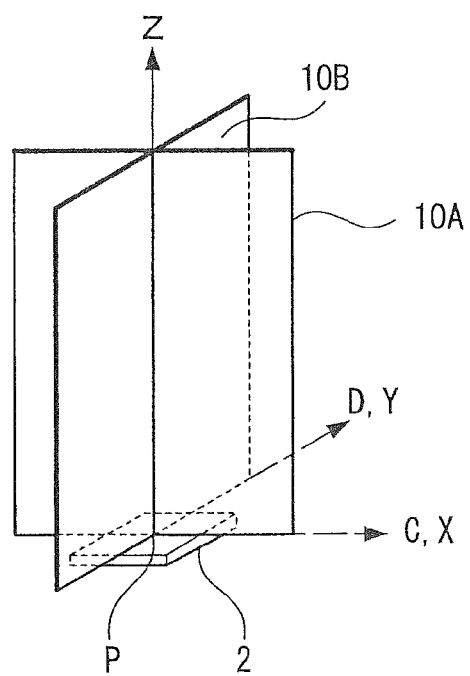
FIG. 4 is a view for explaining the positional relationship between a first grating vector direction and a second grating vector direction of the diffraction grating, and the positional relationship between a first grating interferometer and a second grating interferometer of the displacement detecting device according to the first embodiment of the present invention.

FIG. 4 is a view for explaining the relationship between the first grating vector direction C and the second grating vector direction D of the composite diffraction grating 2, and the relationship between a virtual surface of the first grating interferometer 4 and a virtual surface of the second grating interferometer 5.

Here, as shown in FIG. 4, an arbitrary position of the composite diffraction grating 2 at which the light is incident is defined as an irradiation spot P. Further, the plane passing through the irradiation spot P, parallel to the first grating vector direction C and perpendicular to the surface of the composite diffraction grating 2 is defined as a first virtual surface 10A. Further, the plane passing through the irradiation spot P, parallel to the second grating vector direction D and perpendicular to the surface of the composite diffraction grating 2 is defined as a second virtual surface 10B. Incidentally, the direction perpendicular to the composite diffraction grating 2 is defined as a third direction Z.

The first grating interferometer 4 is arranged corresponding to the first virtual surface 10A, and the second grating interferometer 5 is arranged corresponding to the second virtual surface 10B. The first grating interferometer 4 generates an interference signal of the light diffracted by the first diffraction grating 2a, and the second grating interferometer 5 generates an interference signal of the light diffracted by the second diffraction grating 2b.

Incidentally, in the present embodiment, the first grating vector direction C of the composite diffraction grating 2 is aligned with a first measuring direction, and the second grating vector direction D of the composite diffraction grating 2 is aligned with a second measuring direction.

As shown in FIG. 2, since the first grating interferometer 4 and the second grating interferometer 5 have the same configuration, herein the description will focus on the first grating interferometer 4. Further, among the components of the second grating interferometer 5, like components as those of the first grating interferometer 4 will be denoted by reference numerals formed by adding "B" to the reference numerals of those of the first grating interferometer 4.

The first grating interferometer 4 includes the aforesaid light source 3, a lens 11, a first reflector 12, a second reflector 13, a first mirror 14, a second mirror 16, a beam splitter 17, a first light receiving section 18, and a second light receiving section 19.

The light source 3 is arranged substantially perpendicular to the surface of the composite diffraction grating 2. Incidentally, the light source 3 also serves as the light source of the second grating interferometer 5. It is preferred that a coherent light source is used as the light source 3. Examples of the coherent light source include a gas laser, a semiconductor laser diode, a super luminescent diode, a luminescent diode and the like.

Incidentally, the present embodiment is described using an example in which the light source 3 is arranged in the first grating interferometer 4; however, the present invention is not limited to such configuration. For example, the present invention also includes a configuration in which the light is supplied from a light source arranged outside the first grating interferometer 4 through an optical fiber. Further, by detachably attaching the light source to the optical fiber, maintenance of the light source can be conducted in a place separated from the displacement detecting device 1, so that workability can be improved.

Further, the lens 11 is disposed between the light source and the composite diffraction grating 2. The lens 11 condenses the light L emitted from the light source 3 to any diameter. The lens 11 may be subjected to achromatism depending on the wavelength range to be used. By performing achromatism on the lens 11, the influence exerted by variation in focal length caused by wavelength variation of the light source 3 can be reduced. As a result, displacement can be measured more stably.

Incidentally, the light source 3 and the lens 11 are components shared with the second grating interferometer 5.

The first reflector 12 and the second reflector 13 are arranged along the first grating vector direction C with the light source 3 interposed therebetween. Incidentally, in the second grating interferometer 5, the first reflector 12B and the second reflector 13B are arranged along the second grating vector direction D. The first reflector 12 and the second reflector 13 are each a prism adapted to reflect the light L reflected from the composite diffraction grating 2 toward the composite diffraction grating 2 again. Incidentally, the first reflector 12 and the second reflector 13 may each be configured by combining a plurality of mirrors, instead of being a prism.

The first mirror 14 and the second mirror 16 are arranged along the first grating vector direction C with the light source 3 interposed therebetween. Incidentally, in the second grating interferometer 5, the first mirror 14B and the second mirror 16B are arranged along the second grating vector direction D. The first mirror 14 and the second mirror 16 are each adapted to reflect the light L diffracted twice by the composite diffraction grating 2 toward the beam splitter 17.

Further, the beam splitter 17 is disposed above the light source 3 in the third direction Z. The beam splitter 17 is adapted to superimpose the two beams of light L reflected from the first mirror 14 and the second mirror 16 on each other, cause the two beams of light L to interfere with each other, and splits the light into two beams. Further, the first light receiving section 18 and the second light receiving section 19 are arranged at light outgoing ports of the beam splitter 17. Further, the first light receiving section 18 and the second light receiving section 19 are connected to the first relative position information output section 6.

Further, a first light receiving section 18B and a second light receiving section 19B of the second grating interferometer 5 are connected to the second relative position information output section 7.

Incidentally, the light-reflecting surface of each of the first reflector 12, the second reflector 13, the first mirror 14 and the second mirror 16 may also be made of a metal film such as a gold film or the like. Thus, compared to a general reflecting surface made of dielectric multilayer, change in both the wavelength and the property of the polarized light caused by change in humidity can be suppressed, so that it is possible to stably perform position detection.

Further, the first grating interferometer 4, the second grating interferometer 5, the first relative position information output section 6 and the second relative position information output section 7 constitute a non-contact sensor.

1-2. Operation of Displacement Detecting Device

Figure 5:
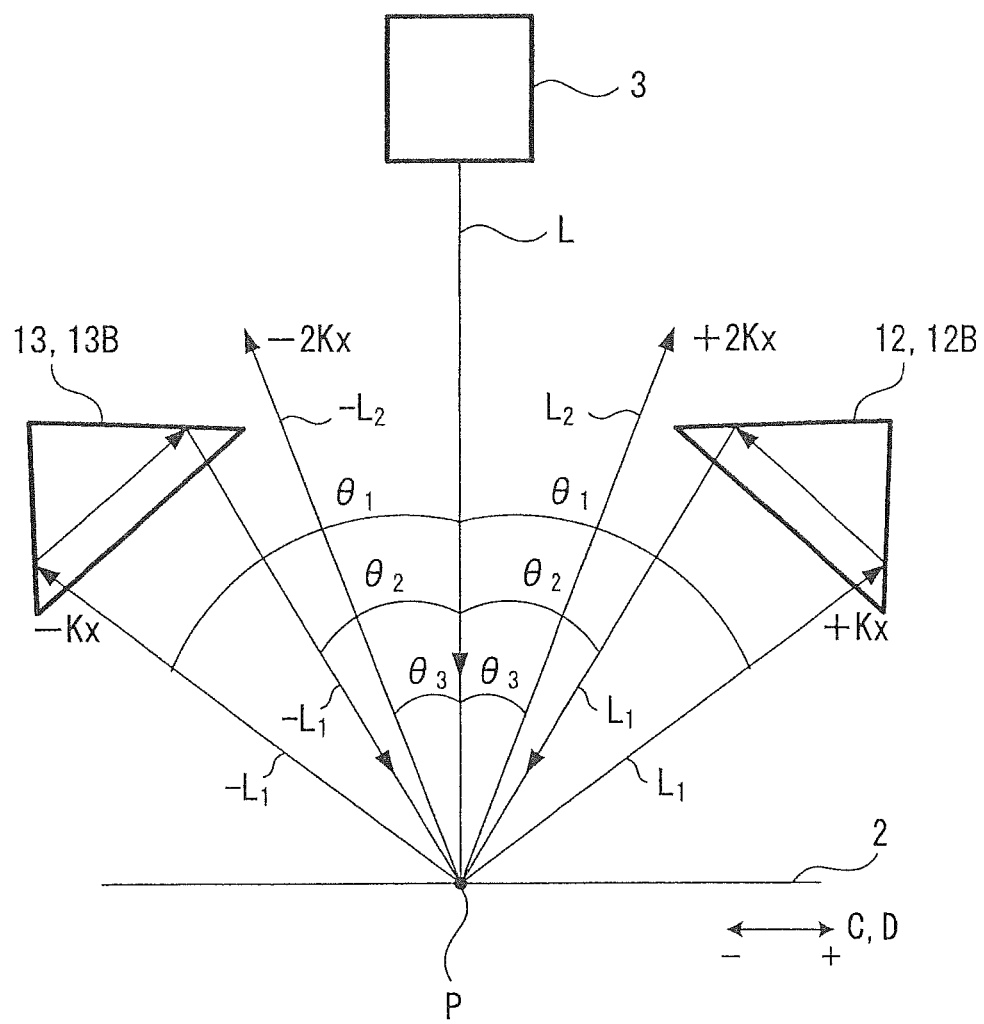
FIG. 5 is an enlarged view showing a primary portion of the displacement detecting device according to the first embodiment of the present invention.

Next, operation of the displacement detecting device 1 will be described below with reference to FIGS. 1, 2, 5 and 6. FIG. 5 is a view showing the primary portion of the displacement detecting device 1 in an enlarged manner.

As shown in FIG. 1, the light L emitted from the light source is transmitted through the lens 11 and substantially vertically incident on the surface of the composite diffraction grating 2 at an arbitrary irradiation spot P. Further, the light L is diffracted into four 1st-order diffracted lights along the first grating vector direction C and the second grating vector direction D by the first diffraction grating 2a and the second diffraction grating 2b of the composite diffraction grating 2.

To be specific, as shown in FIG. 5, the light L is incident at the irradiation spot P, so that positive and negative 1st-order diffracted lights $L_1$, $-L_1$ are obtained due to being diffracted by the first diffraction grating 2a of the composite diffraction grating 2. To be more specific, the 1st-order diffracted light $L_1$ in the positive direction (i.e., the traveling direction) of the first grating vector direction C of the composite diffraction grating 2 is positive, and the 1st-order diffracted light $L_1$ in the negative direction of the first grating vector direction C is negative. The same goes for the second diffraction grating 2b, and therefore the description thereof will be omitted.

Here, diffraction angle of the diffracted light can be obtained by the following equation (1) in general.

$$\sin\theta_{in} + \sin\theta_{out} = n \cdot \lambda / \Lambda \quad (1)$$

Incidentally, the angle "$\theta_{in}$" represents incidence angle of the light incidence on the composite diffraction grating 2, and the angle "$\theta_{out}$" represents diffraction angle (reflection angle in the present embodiment) of the light diffracted from the composite diffraction grating 2. Further, "$\Lambda$" represents the pitch (width) of the grating, "$\lambda$" represents the wavelength of the light L, and "n" represents the number of times of diffraction. In the present invention, since the light is substantially vertically incident on the composite diffraction grating 2, the angle $\theta_{in}$ is 0 degrees.

The 1st-order diffracted lights $L_1$, $-L_1$ are reflected (diffracted) by the composite diffraction grating 2 at a first output angle $\theta_1$ toward the first reflector 12 or the second reflector 13 of the first grating interferometer 4. The positive 1st-order diffracted light $L_1$ travels toward the first reflector 12, and the negative 1st-order diffracted light $-L_1$ travels toward the second reflector 13. Further, the two 1st-order diffracted lights $L_1$, $-L_1$ are reflected by the first reflector 12 and the second reflector 13 and incident again at the irradiation spot P of the composite diffraction grating 2. Thus, the two 1st-order diffracted lights $L_1$, $-L_1$ are diffracted again by the composite diffraction grating 2 to become 2nd-order diffracted lights $L_2$, $-L_2$ and emitted from the composite diffraction grating 2.

At this time, the two 1st-order diffracted lights $L_1$, $-L_1$ are reflected twice in the first reflector 12 or the second reflector 13. Thus, the incidence angle $\theta_2$ of the two 1st-order diffracted lights $L_1$, $-L_1$ reflected by the first reflector 12 and the second reflector 13 and incident into the composite diffraction grating 2 is different from the output angle $\theta_1$. Incidentally, the number of times of the reflection of the 1st-order diffracted lights $L_1$, $-L_1$ by the first reflector 12 and the second reflector 13 is not limited to two. For example, the two 1st-order diffracted lights $L_1$, $-L_1$ may also be reflected in the first reflector 12 and the second reflector 13 three times or more.

FIG. 6 is a view showing another example of the primary portion of the displacement detecting device 1 viewed from the upper side of the irradiation spot P.

Incidentally, FIG. 5 shows an example in which the 1st-order diffracted lights $L_1$, $-L_1$ and the 2nd-order diffracted lights $L_2$–$L_2$ are arranged in the virtual surfaces 10A, 10B. However, as shown in FIG. 6, the 1st-order diffracted lights $L_1$, $-L_1$ and the 2nd-order diffracted lights $L_2$, $-L_2$ do not have to be arranged in the virtual surfaces 10A, 10B. Since the 1st-order diffracted lights $L_1$, $-L_1$ are incident on the diffraction grating at the incidence angle $\theta_2$, if the 1st-order diffracted lights $L_1$, $-L_1$ are arranged in the virtual surfaces 10A, 10B, there is a possibility that the 0-order light (i.e., the light L) of the 1st-order diffracted light L1 might be superimposed on the 1st-order diffracted light $-L1$. Similarly, there is a possibility that the 0-order light (i.e., the light L) of the 1st-order diffracted light $-L1$ might be superimposed on the 1st-order diffracted light L1.

To avoid such problem, as shown in FIG. 6, the 1st-order diffracted lights $L_1$, $-L_1$ may also be incident at an angle $\theta_4$ viewed from the upper side of the composite diffraction grating 2. With such an arrangement, the problem that the 0-order light (i.e., the light L) of the 1st-order diffracted light L1 might be superimposed on the 1st-order diffracted light $-L1$ and that the 0-order light (i.e., the light L) of the 1st-order diffracted light $-L1$ might be superimposed on the 1st-order diffracted light L1 can be effectively prevented, and therefore unnecessary stray light can be prevented from returning to the light source 3.

Further, the 2nd-order diffracted lights $L_2$, $-L_2$ diffracted twice by the composite diffraction grating 2 are emitted (i.e., diffracted) at a second output angle $\theta_3$, which is different from the first output angle $\theta_1$ and the incidence angle $\theta_2$. Thus, the 2nd-order diffracted lights $L_2$, $-L_2$ will not become parallel to the 1st-order diffracted lights $L_1$, $-L_1$ or the incident light L. Thus, the possibility that the stray light caused by multiple reflection of the components might be superimposed on the interference light can be ruled out.

Further, when performing the second diffraction, the light is also irradiated at the same irradiation spot P as the first diffraction. Thus, there is no concern about the influence of the surface accuracy of the surface of the composite diffraction grating 2. Thus, it is possible to eliminate the error caused by roughness of the surface of the composite diffraction grating 2.

Next, the 2nd-order diffracted lights $L_2$, $-L_2$ are respectively incident on the first mirror 14 and the second mirror 16. To be specific, the 2nd-order diffracted light $L_2$ is incident on the first mirror 14 and reflected toward the beam splitter 17 by the first mirror 14. Further, the 2nd-order diffracted light $-L_2$ is incident on the second mirror 16 and reflected toward the beam splitter 17 by the second mirror 16.

Further, the two 2nd-order diffracted lights $L_2$, $-L_2$ are superimposed on each other so as to interfere with each other to become interference light $L_d$. Further, the interference light $L_d$ is split by the beam splitter 17 into two beams, and the two beams of light are respectively guided to the first light receiving section 18 and the second light receiving section 19.

In the first light receiving section 18, the interference light $L_d$ is received, and the received interference light $L_d$ is photoelectrically converted to obtain an interference signal which is expressed as "A cos(4Kx+$\delta$)". In this expression, "A" represents the amplitude of the interference signal, and "K" represents the wave number which is expressed by "$2\pi/\Lambda$". Further, "x" represents amount of the movement of the composite diffraction grating 2 in the first grating vector direction C, and "$\delta$" represents an initial phase.

Here, as shown in FIG. 5, when being initially incident on the composite diffraction grating 2, the light L is split into positive and negative two 1st-order diffracted lights $L_1$, $-L_1$. Further, the 1st-order diffracted light L1 is reflected by the second reflector 13 and diffracted twice (2K) by the composite diffraction grating 2. Similarly, the 1st-order diffracted light $-L1$ is diffracted twice (2K) by the composite diffraction grating 2. Further, by being superimposed on each other by the beam splitter 17, the coefficient of "x" becomes 2K+2K=4K. Thus, as shown in the aforesaid expression of the interference signal, "x" is multiply by "4K".

Thus, when the composite diffraction grating 2 moves in the first grating vector direction C, four waves (i.e., four bright and dark fringes of light) per pitch (i.e., 1Λ) of the first diffraction grating 2a can be obtained by the first light receiving section 18. Thus, the displacement can be detected with high resolution.

Incidentally, the phase of the signal obtained by the second light receiving section 19 is different from the phase of the interference signal obtained by the first light receiving section 18 by 90 degrees. Thus, it is possible to obtain a sine signal and a cosine signal. Further, the amount of displacement in the first grating vector direction C can be detected by outputting the sine signal and the cosine signal to the first relative position information output section 6. The details of the first relative position information output section 6 will be described later in other embodiments.

In the positive and negative 1st-order diffracted lights $L_1$, $-L_1$ diffracted by the composite diffraction grating 2, not only the positive 1st-order diffracted light $L_1$, but also the negative 1st-order diffracted light $-L_1$ are used for generating the interference signal. Since the negative 1st-order diffracted light $-L_1$ or the positive 1st-order diffracted light $L1$ does not become unnecessary stray light, interference intensity can be accurately detected. Further, the quantity of the interference light $L_d$ received by the first light receiving section 18 and the second light receiving section 19 can be increased, and detection accuracy can be improved.

Incidentally, the amount of displacement in the second grating vector direction D of the second grating interferometer 5 is detected by two diffracted lights $L_1$, $-L_1$ having been incident at the irradiation spot P from the light source 3 and diffracted along the second grating vector direction D. Since other aspects of the operation of detecting the amount of displacement in the second grating vector direction D are identical to those of the operation of detecting the amount of displacement in the first grating vector direction C, the description thereof will be omitted here.

In the aforesaid manner, the light L emitted from one light source 3 can be efficiently used by the first grating interferometer 4 and the second grating interferometer 5. Thus, the amount of displacement of the composite diffraction grating 2 in both the first grating vector direction C and the second grating vector direction D can be detected by the light L emitted from one light source 3. Therefore, it is not necessary to prepare two light sources respectively for the grating interferometers 4, 5, and therefore the number of components can be reduced.

2. Second Embodiment

Next, a displacement detecting device 31 according to a second embodiment of the present invention will be described below with reference to FIGS. 7 and 8.

Figure 7:
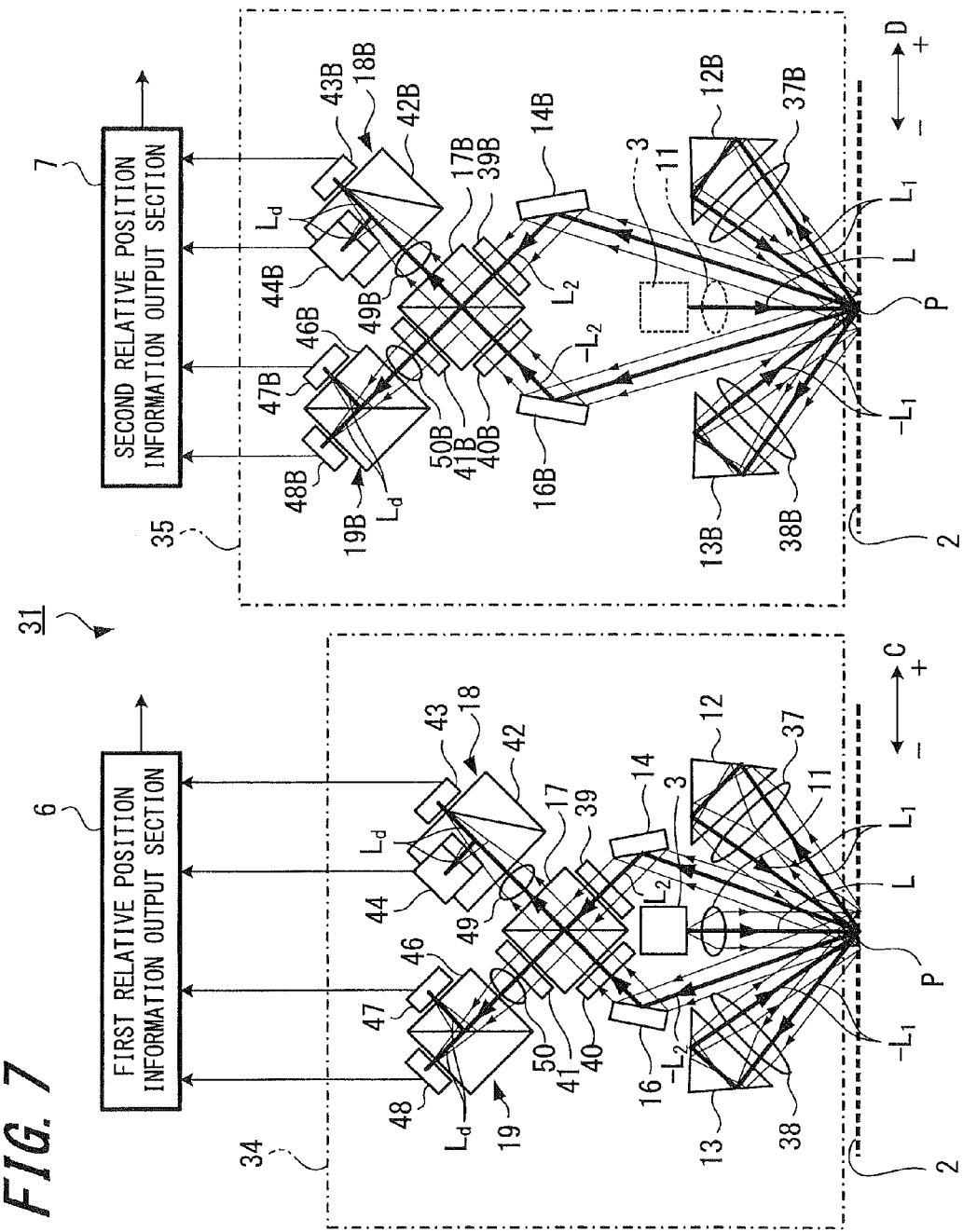
FIG. 7 is a side view schematically showing an optical system of a displacement detecting device according to a second embodiment of the present invention.
Figure 8:
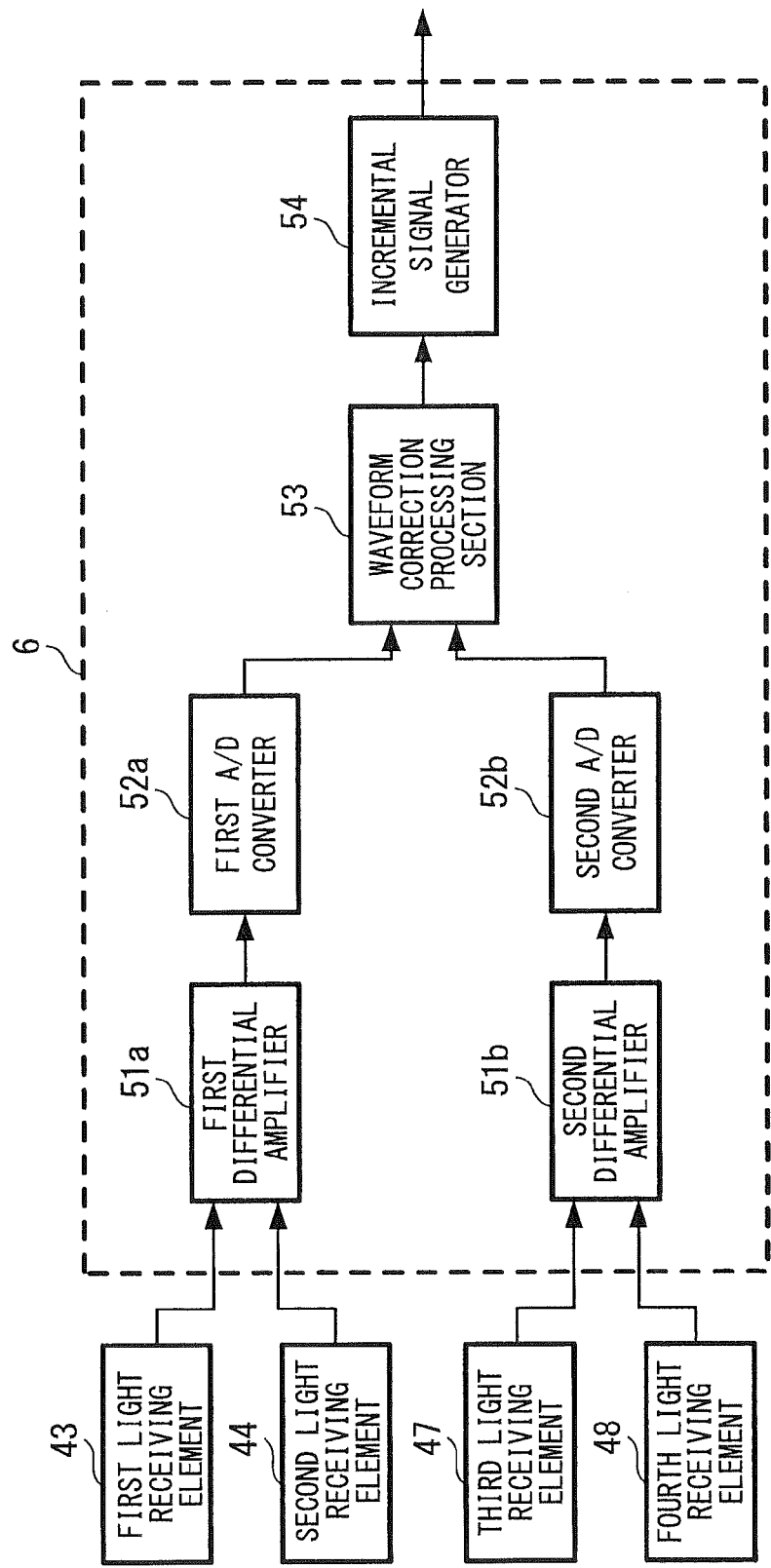
FIG. 8 is a block diagram showing a relative position information output section of a displacement detecting device according to the second embodiment of the present invention.

FIG. 7 is a side view showing an optical system of the displacement detecting device 31 according to the second embodiment, and FIG. 8 is a block diagram showing a relative position information output section of the displacement detecting device 31.

The displacement detecting device 31 according to the second embodiment differs from the displacement detecting device 1 of the first embodiment in that a lens is provided between the composite diffraction grating 2 and each reflector and that the configuration of both the first light receiving section and the second light receiving section is different, and therefore the description below will be focused on these differences. Thus, in the displacement detecting device 31 of the second embodiment, like components are denoted by like reference numerals as of the displacement detecting device 1 of the first embodiment, and the explanation thereof will be omitted.

As shown in FIG. 7 the displacement detecting device 31 includes the composite diffraction grating 2, the light source 3, a first grating interferometer 34, a second grating interferometer 35, the first relative position information output section 6 and the second relative position information output section 7. The light source 3 of the displacement detecting device 31 according to the second embodiment is adapted to emit circularly polarized light.

Since the first grating interferometer 34 and the second grating interferometer 35 have the same configuration, herein the description will focus on the first grating interferometer 34. Further, among the components of the second grating interferometer 35, like components as those of the first grating interferometer 34 will be denoted by reference numerals formed by adding "B" to the reference numerals of those of the first grating interferometer 34.

As shown in FIG. 7, a first lens 37 is disposed between the composite diffraction grating 2 and the first reflector 12. Further, a second lens 38 is disposed between the composite diffraction grating 2 and the second reflector 13.

The focal length of the first lens 37 is equal to the distance between the composite diffraction grating 2 and the lens 11. The focal length of the second lens 38 is also equal to the distance between the composite diffraction grating 2 and the lens 11.

Thus, since the focal length of both the first lens 37 and the second lens 38 is equal to the distance between the composite diffraction grating 2 and the lens 11, the optical path after passing through the first lens 37 in the case where the composite diffraction grating 2 is tilted is substantially in parallel with the optical path after passing through the first lens 37 in the case where the composite diffraction grating 2 is not tilted. Further, since the first reflector 12 and the second reflector 13 are each formed by two mirrors, when being incident again on the composite diffraction grating 2, the light can be irradiated near the irradiation spot P. With such an arrangement, measurement error caused by tilt of the composite diffraction grating 2 can be reduced.

As a result, the second incident point formed by the light reflected by the first reflector 12 and the second reflector 13 and incident on the composite diffraction grating will unlikely be deviated from the arbitrary irradiation spot P. Further, tolerance of the tilt of the composite diffraction grating 2 can be improved.

A first phase plate 39 and a second phase plate 40 are arranged on the side of the light incident ports of the beam splitter 17. To be specific, the first phase plate 39 is arranged in the optical path between the beam splitter 17 and the first mirror 14, and the second phase plate 40 is arranged in the optical path between the beam splitter 17 and the second mirror 16.

The first phase plate 39 and the second phase plate 40 are each composed of a quarter-wave plate, for example, and are adapted to convert the 2nd-order diffracted lights $L_2$, $-L_2$ (which are circularly polarized lights) into linearly polarized light. Further, in order to convert the transmitted 2nd-order diffracted lights $L_2$, $-L_2$ into the linearly polarized lights perpendicular to each other, the first phase plate 39 and the second phase plate 40 are arranged so that the crystal axes thereof are perpendicular to each other.

Further, the first light receiving section 18 includes a first polarizing beam splitter 42, a first light receiving element 43 and a second light receiving element 44. The second light receiving section 19 includes a second polarizing beam splitter 46, a third light receiving element 47 and a fourth light receiving element 48.

A third lens 49 is arranged in the optical path between the beam splitter 17 and the first light receiving section 18. Further, a third phase plate 41 and a fourth lens 50 are arranged in the optical path between the beam splitter 17 and the second light receiving section 19.

The 2nd-order diffracted lights $L_2$, $-L_2$ having been converted into two linearly polarized lights perpendicular to each other by the first phase plate 39 and the second phase plate 40 are superimposed on each other and split into two beams by the beam splitter 17, and the two split beams are respectively guided into the third lens 49 and the fourth lens 50.

Here, the first polarizing beam splitter 42 is obliquely disposed so that the polarization directions of the two 2nd-order diffracted lights $L_2$, $-L_2$ are inclined with respect to the incidence plane of the first polarizing beam splitter 42 by an angle of 45 degrees respectively, wherein the polarization directions of the two 2nd-order diffracted lights $L_2$, $-L_2$ are different from each other by 90 degrees.

Here, the first polarizing beam splitter 42 is adapted to split the light by reflecting the interference light having s-polarized component and transmitting the interference light having p-polarized component.

With such an arrangement, the two 2nd-order diffracted lights $L_2$, $-L_2$ respectively have the p-polarized component and the s-polarized component with respect to the first polarizing beam splitter 42. Thus, since the two 2nd-order diffracted lights $L_2$, $-L_2$ transmitted through the first polarizing beam splitter 42 are p-polarized lights having the same polarization direction, for example, the two 2nd-order diffracted lights $L_2$, $-L_2$ can interfere with each other.

Similarly, since the two 2nd-order diffracted lights $L_2$, $-L_2$ reflected by the first polarizing beam splitter 42 are s-polarized lights with respect to the first polarizing beam splitter 42 and since the two 2nd-order diffracted lights $L_2$, $-L_2$ reflected by the first polarizing beam splitter 42 have the same polarization direction, the two 2nd-order diffracted lights $L_2$, $-L_2$ can interfere with each other.

The interference light $L_d$ transmitted through the first polarizing beam splitter 42 is received by the first light receiving element 43. Further, the interference light $L_d$ reflected by the first polarizing beam splitter 42 is received by the second light receiving element 44. Here, the phase of the signal photoelectrically converted by the first light receiving element 43 and the phase of the signal photoelectrically converted by the second light receiving element 44 are different from each other by 180 degrees.

Similar to the displacement detecting device 1 of the first embodiment, an interference signal expressed as "A cos (4Kx+δ)" is obtained by the first light receiving element 43 and the second light receiving element 44.

On the other hand, the two 2nd-order diffracted lights $L_2$, $-L_2$ guided into the fourth lens 50 is incident on the third phase plate 41, which is configured by a quarter-wave plate or the like. The two 2nd-order diffracted lights $L_2$, $-L_2$ (which are linearly polarized lights having the polarization directions different from each other by 90 degrees) are transmitted through the third phase plate 41 and thereby become two circularly polarized lights with mutually reversed rotational directions. Further, since the two circularly polarized lights with mutually reversed rotational directions are located in the same optical path, they are superimposed on each other to thereby become linearly polarized light, and such linearly polarized light is incident on the second polarizing beam splitter 46.

The s-polarized component of such linearly polarized light is reflected by the second polarizing beam splitter 46 and received by the third light receiving element 47. Further, the p-polarized component is transmitted through the second polarizing beam splitter 46 and received by the fourth light receiving element 48.

The linearly polarized light incident on the second polarizing beam splitter 46 is generated by superimposing the two circularly polarized lights with mutually reversed rotational directions on each other. Further, the polarization direction of the linearly polarized light incident on the second polarizing beam splitter 46 rotates one revolution every time the composite diffraction grating 2 moves by Λ/2 in the first grating vector direction C. Thus, in the same manner, an interference signal expressed by "A cos(4Kx+δ')" is obtained by the third light receiving element 47 and the fourth light receiving element 48. Here, "δ'" represents an initial phase.

Further, the phase of the signal photoelectrically converted by the third light receiving element 47 and the phase of the signal photoelectrically converted by the fourth light receiving element 48 are different from each other by 180 degrees.

Incidentally, in the present embodiment, the second polarizing beam splitter 46, which is adapted to split the beams received by the third light receiving element 47 and the fourth light receiving element 48, is disposed at an angle of 45 degrees with respect to the first polarizing beam splitter 42. Thus, the phase of the signals obtained by the third light receiving element 47 and the fourth light receiving element 48 are different from the phase of the signals obtained by the first light receiving element 43 and second light receiving element 44 by 90 degrees.

Thus, it is possible to obtain a Lissajous signal by using the signals obtained by the first light receiving element 43 and second light receiving element 44 as a sine signal, and using the signals obtained by the third light receiving element 47 and fourth light receiving element 48 as a cosine signal.

The signals obtained by these light receiving elements are calculated by the first relative position information output section 6, and the amount of displacement of the surface-to-be-measured is counted.

As shown in FIG. 8, the first relative position information output section 6 includes a first differential amplifier 51*a*, a second differential amplifier 51*b*, a first A/D converter 52*a*, a second A/D converter 52*b*, a waveform correction processing section 53 and an incremental signal generator 54.

For example, in the first relative position information output section 6 of the present embodiment, the signal obtained by the first light receiving element 43 and the signal obtained by the second light receiving element 44 whose phases differ from each other by 180 degrees are differential-amplified by the first differential amplifier 51*a*, so that DC component of the interference signal is cancelled.

Further, such signal is A/D-converted by the first A/D converter 52*a*, and signal amplitude, offset and phase thereof are corrected by the waveform correction processing section 53. In the incremental signal generator 54, such signal is calculated as an A-phase incremental signal, for example.

Similarly, the signal obtained in the third light receiving element 47 and the signal obtained in the fourth light receiving element 48 are differential-amplified by the second differential amplifier 51*b* and A/D-converted by the second A/D converter 52*b*. Further, signal amplitude, offset and phase of the signal are corrected by the waveform correction processing section 53, and the signal is outputted from the incremental signal generator 54 as a B-phase incremental signal whose phase is different from that of the A-phased incremental signal by 90 degrees.

Whether the two phases of the incremental signals obtained in the aforesaid manner are positive or negative is discriminated by a pulse discrimination circuit or the like (not shown in the drawings), and thereby whether the amount of displacement of the surface-to-be-measured in the first grating vector direction C is in positive direction or negative direction can be detected.

Further, it is possible to perform measurement to see how many the aforesaid cycles of the intensity of the interference light of the two diffracted lights $L_2$, $-L_2$ have changed by counting the number of pulses of the incremental signal with a counter (not shown in the drawings). Thus, the amount of displacement in the first grating vector direction C can be detected by the aforesaid processing.

Incidentally, the relative position information outputted by the first relative position information output section 6 of the present embodiment may either be the aforesaid two phases of incremental signals, or be a signal including the amount and direction of the displacement calculated based on the two phases of incremental signals.

Since the second relative position information output section 7 has the same configuration as that of the first relative position information output section 6, the description thereof will be omitted.

Since other aspects of the configuration of the displacement detecting device 31 are identical to those of the displacement detecting device 1 of the first embodiment, the description thereof will be omitted. The same advantages as those of the displacement detecting device 1 of the first embodiment can also be achieved by the displacement detecting device 31 having the aforesaid configuration.

3. Third Embodiment

Figure 10A:
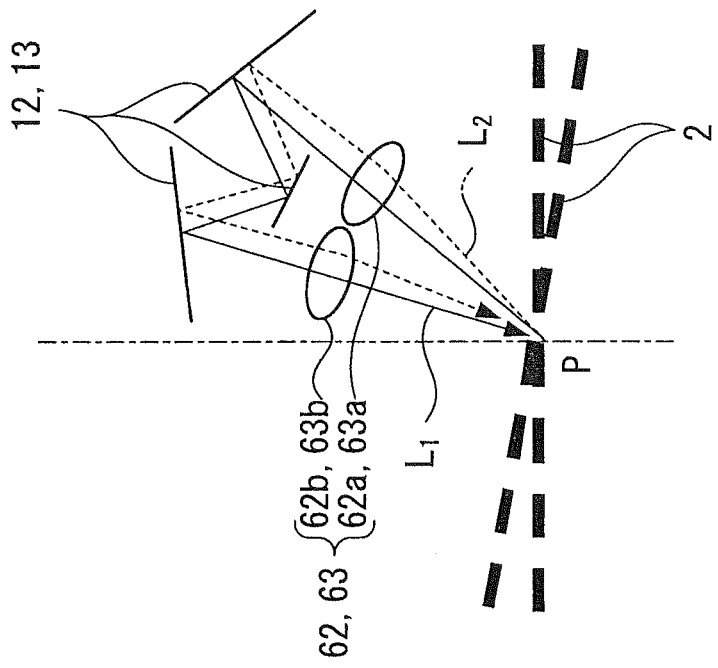
FIGS. 10A and 10B are each an enlarged view showing a primary portion of the displacement detecting device according to the third embodiment of the present invention.
Figure 10B:
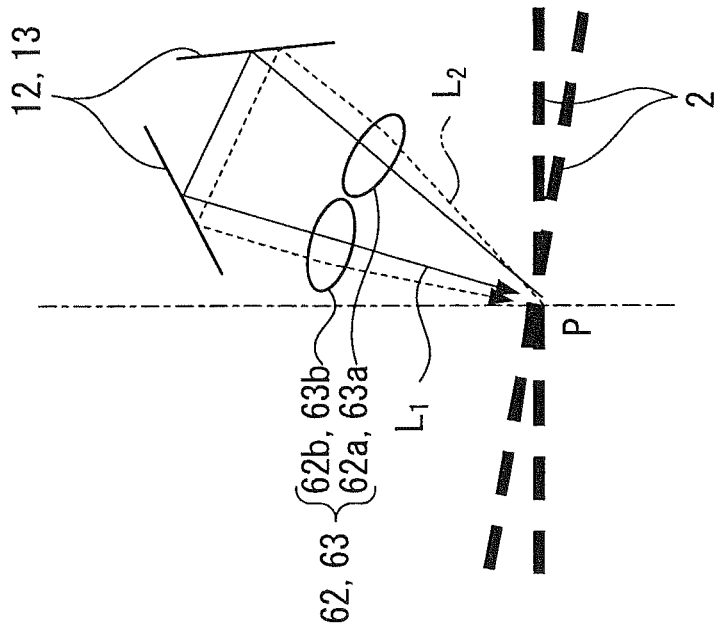

Next, a displacement detecting device 61 according to a third embodiment of the present invention will be described below with reference to FIGS. 9, 10A and 10B.

FIG. 9 is a side view showing an optical system of the displacement detecting device 61 according to the third embodiment of the present invention. FIGS. 10A and 10B are each an enlarged view showing a primary portion of the displacement detecting device 31 according to the third embodiment of the present invention.

The displacement detecting device 61 of the third embodiment differs from the displacement detecting device 31 of the second embodiment in the configuration of the first lens and the second lens. Thus, in the displacement detecting device 61 of the third embodiment, like components are denoted by like reference numerals as of the displacement detecting device 31 of the second embodiment, and the explanation thereof will be omitted, so that description will focus on the first lens and the second lens.

As shown in FIG. 9, the displacement detecting device 61 includes a first grating interferometer 64 and a second grating interferometer 65. A first lens group 62 is arranged in the optical path between the first reflector 12 and the composite diffraction grating 2 of the first grating interferometer 64. Further, a second lens group 63 is arranged in the optical path between the second reflector 13 and the composite diffraction grating 2.

The first lens group 62 includes a first lens 62a and a second lens 62b. The first lens 62a is arranged in the optical path through which the 1st-order diffracted light $L_1$ reflected from the composite diffraction grating 2 is incident on the first reflector 12. Further, the second lens 62b is arranged in the optical path through which the 1st-order diffracted light $L_1$ reflected by the first reflector 12 is irradiated on the composite diffraction grating 2.

Further, the length of the optical path from the first lens 62a to the second lens 62b through the first reflector 12 is equal to the sum of the focal length of the first lens 62a and the focal length of the second lens 62b.

The second lens group 63 includes a first lens 63a and a second lens 63b. The first lens 63a is arranged in the optical path through which the 1st-order diffracted light $-L_1$ reflected from the composite diffraction grating 2 is incident on the second reflector 13. Further, the second lens 63b is arranged in the optical path through which the 1st-order diffracted light $-L_1$ reflected by the second reflector 13 is irradiated on the composite diffraction grating 2.

Further, the length of the optical path from the first lens 63a to the second lens 63b through the second reflector 13 is equal to the sum of the focal length of the first lens 63a and the focal length of the second lens 63b.

Further, the focal length of each of the first lens 62a, 62b, 63a, 63b, which configure the first lens group 62 and the second lens group 63, is equal to the distance between the composite diffraction grating 2 and the lens 11. Thus, as shown in FIG. 10A, the optical path after passing through the first lens 62a of the first lens group 62 in the case where the composite diffraction grating 2 is tilted is substantially in parallel with the optical path after passing through the first lens 62a in the case where the composite diffraction grating 2 is not tilted. Here, in the case where the first reflector 12 and the second reflector 13 are each composed of two mirrors, when being incident again on the composite diffraction grating 2, the light can be incident near the irradiation spot P. With such an arrangement, measurement error caused by tilt of the composite diffraction grating 2 can be reduced.

Further, in the case where the first reflector 12 and the second reflector 13 are each composed of three mirrors, when being incident again on the composite diffraction grating 2, the light is incident near the irradiation spot P, and the incident angle is identical to the tilt direction. Thus, the diffracted light caused by the second diffraction can be stabilized.

As a result, the second incident point formed by the light incident on the composite diffraction grating 2 will unlikely be deviated from the arbitrary irradiation spot P. Further, even in the case where the composite diffraction grating 2 is inclined or where the surface of the composite diffraction grating 2 has waviness or the like formed thereon, the 1st-order diffracted lights $L_1$, $-L_1$ can be incident at the irradiation spot P, which is initially formed by the light L incident on the composite diffraction grating 2, and therefore the detection accuracy can be prevented from being deteriorated.

Further, wave aberration, which becomes large when there is so-called "fluctuation in the third direction Z" such as tilt (fluctuation) and clearance fluctuation, can be reduced, and therefore it is possible to obtain stable interference signal.

Incidentally, similar to the first grating interferometer 64, the second grating interferometer 65 has a first lens group 62B and a second lens group 63B. Since the first lens group 62B and the second lens group 63B have the same configuration as that of the first lens group 62 and the second lens group 63 of the first grating interferometer 64, the description thereof will be omitted.

Since other aspects of the configuration of the displacement detecting device 61 are identical to those of the displacement detecting device 31 of the second embodiment, the description thereof will be omitted. The same advantages as those of the displacement detecting device 31 of the second embodiment can also be achieved by the displacement detecting device 61 having the aforesaid configuration.

4. Fourth Embodiment

Next, a displacement detecting device 71 according to a fourth embodiment of the present invention will be described below with reference to FIG. 11.

Figure 11:
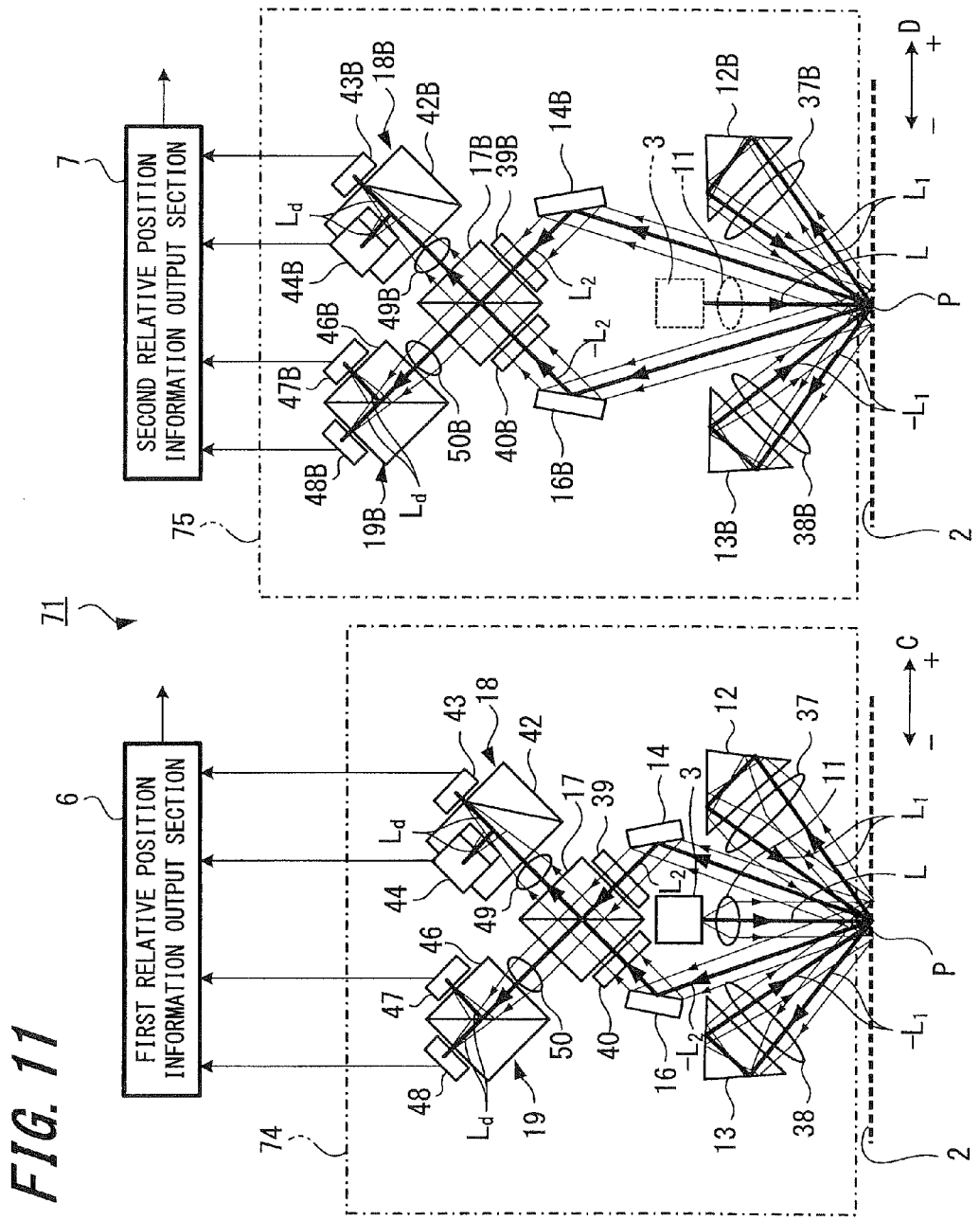
FIG. 11 is a side view schematically showing an optical system of a displacement detecting device according to a fourth embodiment of the present invention.

FIG. 11 is a side view showing an optical system of the displacement detecting device 71 according to the fourth embodiment of the present invention.

The displacement detecting device 71 according to the fourth embodiment differs from the displacement detecting device 31 of the second embodiment in that the light emitted from the light source 3 is linearly polarized light and that the third phase plate 41 of the displacement detecting device 31 is eliminated. Thus, in the displacement detecting device 71 of the fourth embodiment, like components are denoted by like reference numerals as of the displacement detecting device 31 of the second embodiment, and the explanation thereof will be omitted.

Linearly polarized light L is emitted from the light source 3 of the displacement detecting device 71 according to the fourth embodiment shown in FIG. 11. The first phase plate 39 and the second phase plate 40 are each a quarter-wave plate, for example. Further, the first phase plate 39 and the second phase plate 40 convert the two 2nd-order diffracted lights $L_2$, $-L_2$, which are linearly polarized lights, into two circularly polarized lights with mutually reversed rotational directions. Thus, the crystal axis of the first phase plate 39 and the crystal axis of the second phase plate 40 are perpendicular to each other.

The two 2nd-order diffracted lights $L_2$, $-L_2$, which are two circularly-polarized lights with mutually reversed rotational directions, are superimposed on each other by the beam splitter 17. Further, since the two circularly polarized lights with mutually reversed rotational directions are located in the same optical path, they are superimposed on each other to thereby become linearly polarized light whose polarization direction rotates, and such linearly polarized light is incident on the first polarizing beam splitter 42 or the second polarizing beam splitter 46.

Since other aspects of the configuration of the displacement detecting device 71 are identical to those of the displacement detecting device 31 of the second embodiment, the description thereof will be omitted. The same advantages as those of the displacement detecting device 31 of the second embodiment can also be achieved by the displacement detecting device 71 having the aforesaid configuration.

Incidentally, in the displacement detecting device 71 of the fourth embodiment, the third phase plate 41 of the displacement detecting device 31 of the second embodiment is eliminated, and therefore the number of components can be reduced.

5. Fifth Embodiment

Next, a displacement detecting device 81 according to a fifth embodiment of the present invention will be described below with reference to FIG. 12.

Figure 12:
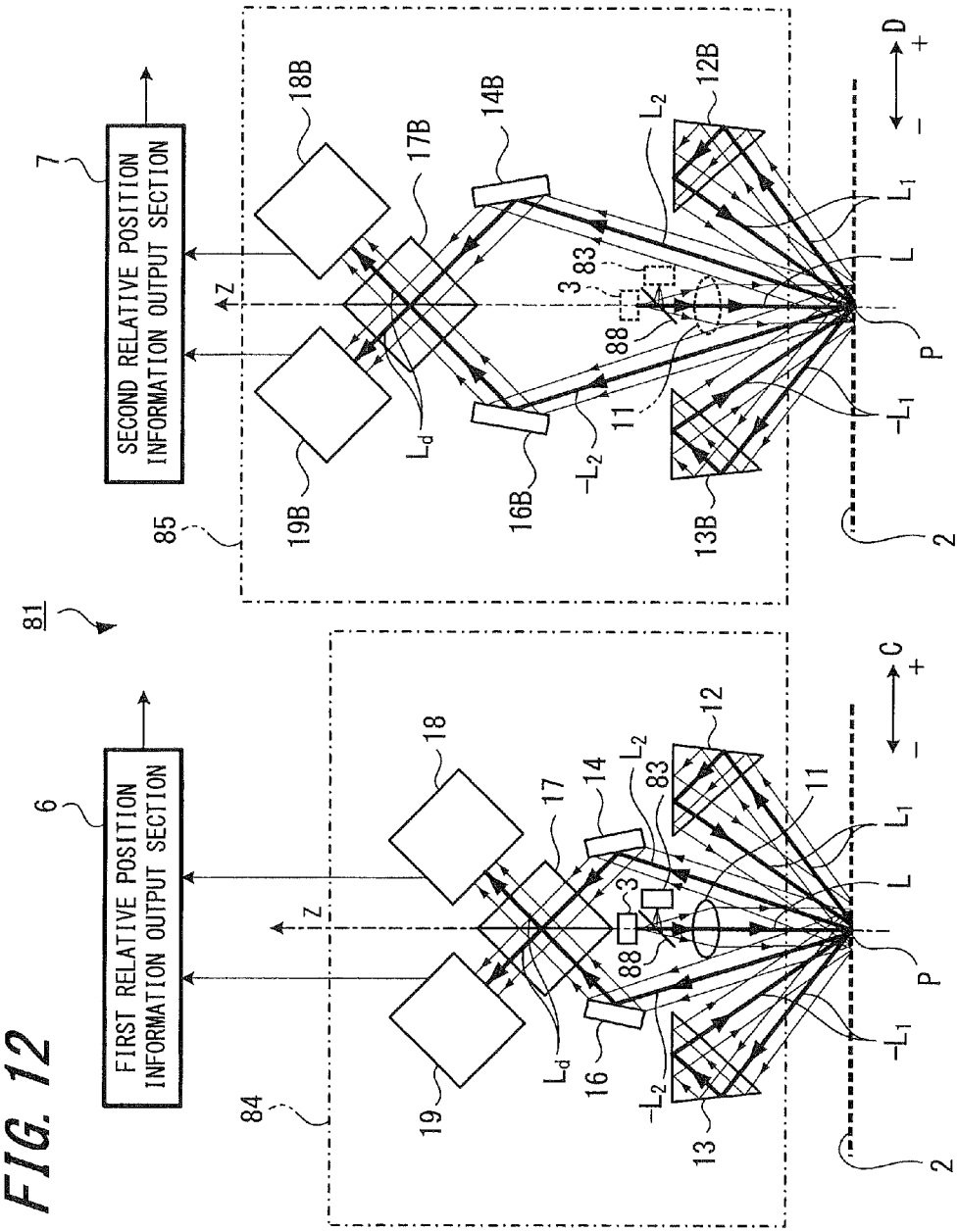
FIG. 12 is a side view schematically showing an optical system of a displacement detecting device according to a fifth embodiment of the present invention.

FIG. 12 is a side view showing an optical system of the displacement detecting device 81 according to the fifth embodiment of the present invention.

The displacement detecting device 81 according to the fifth embodiment is identical to the displacement detecting device 1 of the first embodiment except that the displacement detecting device 81 is further provided with a second light source 83. Thus, in the displacement detecting device 81, like components are denoted by like reference numerals as of the displacement detecting device 1 of the first embodiment, and the explanation thereof will be omitted, so that description will focus on the second light source 83.

As shown in FIG. 12, the displacement detecting device 81 includes a first grating interferometer 84 and a second grating interferometer 85. The first grating interferometer 84 and the second grating interferometer 85 have a first light source 3, a second light source 83 and a second beam splitter 88. The second beam splitter 88 superimposes the light emitted from the first light source 3 and the light emitted from the second light source 83 on each other, so that the superimposed light is irradiated at an arbitrary irradiation spot P of the composite diffraction grating 2.

Since other aspects of the configuration of the displacement detecting device 81 are identical to those of the displacement detecting device 1 of the first embodiment, the description thereof will be omitted. The same advantages as those of the displacement detecting device 1 of the first embodiment can also be achieved by the displacement detecting device 81 having the aforesaid configuration.

Incidentally, with the displacement detecting device 81 of the fifth embodiment, in the case where the wavelength of the first light source 3 and the wavelength of the second light source 83 are substantially equal to each other, the first light source 3 and the second light source 83 alternately emit light, and therefore the service life of the two light sources can be prolonged. Further, even when a failure or trouble occurs in the first light source 3, the second light source 83 can be used as a spare light source, and therefore the displacement detecting device can be used for long period of time.

Further, the light emitted from the first light source 3 and the light emitted from the second light source 83 may also be the linearly polarized lights whose polarizing axes are perpendicular to each other. In such a case, the second beam splitter 88 is a polarizing beam splitter. With such an arrangement, when the first light source can not be used due to expiration of the service life or the like, the light source can be changed over to the second light source 83, and therefore operating time can be prolonged. Further, light loss caused by the beam splitter 17 can be reduced to the minimum.

Furthermore, in the case where the wavelength of the light emitted from the first light source 3 and the wavelength of the light emitted from the second light source 83 are set to different values from each other, the second beam splitter 88 is a wavelength-selective filter. With such an arrangement, the first grating interferometer 84 and the second grating interferometer 85 can obtain an interference signal using different light sources under the condition that the arbitrary irradiation spots thereof are the same. As a result, the high-order diffracted light and the stray lights can be prevented from exerting influence on each other's grating interferometers 84, 85.

6. Sixth Embodiment

Next, a displacement detecting device 91 according to a sixth embodiment of the present invention will be described below with reference to FIG. 13.

Figure 13:
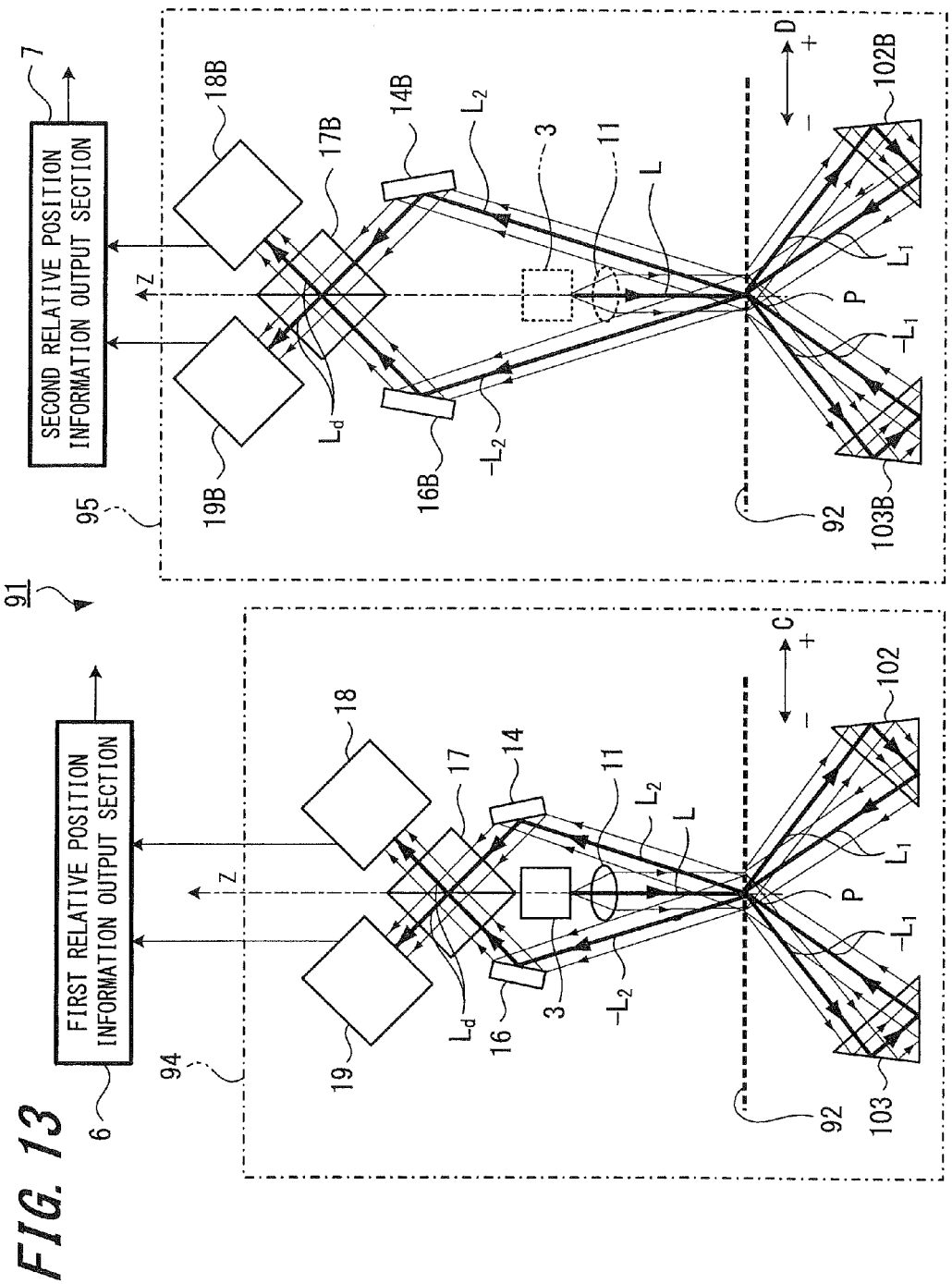
FIG. 13 is a side view schematically showing an optical system of a displacement detecting device according to a sixth embodiment of the present invention.

FIG. 13 is a side view showing an optical system of the displacement detecting device 91 according to the sixth embodiment of the present invention.

The displacement detecting device 91 of the sixth embodiment differs from the displacement detecting device 1 of the first embodiment in that the reflective composite diffraction grating is changed into a transmissive composite diffraction grating. Thus, in the displacement detecting device 91, like components are denoted by like reference numerals as of the displacement detecting device 1 of the first embodiment, and the explanation thereof will be omitted, so that description will focus on the composite diffraction grating and the reflectors.

As shown in FIG. 13, a composite diffraction grating 92 of the displacement detecting device 91 according to the sixth embodiment is a transmissive diffraction grating. Since other aspects of the composite diffraction grating 92 of the displacement detecting device 91 are identical to those of the composite diffraction grating 2 of the displacement detecting device 1 of the first embodiment, the description thereof will be omitted. The diffraction angle of the transmissive composite diffraction grating 92 can also be expressed by expression (1) as the diffraction angle of the reflective composite diffraction grating 2.

As shown in FIG. 13, since a first grating interferometer and a second grating interferometer 95 have the same configuration, herein the description will focus on the first grating interferometer 94. Further, among the components of the second grating interferometer 95, like components as those of the first grating interferometer 94 will be denoted by reference numerals formed by adding "B" to the reference numerals of those of the first grating interferometer 94.

The first grating interferometer 94 includes the aforesaid light source 3, the lens 11, a first reflector 102, a second reflector 103, the first mirror 14, the second mirror 16, the beam splitter 17, the first light receiving section 18, and the second light receiving section 19.

The first reflector 102 and the second reflector 103 are arranged on the side opposite to the light source 3 and the direction Z with the composite diffraction grating 92 interposed in between. The 1st-order diffracted lights $L_1$, $-L_1$ transmitted through and diffracted by the composite diffraction grating 92 are incident on the first reflector 102 or the second reflector 103. To be specific, the positive 1st-order diffracted light $L_1$ is incident on the first reflector 102, and the negative 1st-order diffracted light $-L_1$ is incident on the second reflector 103.

Further, the first reflector 102 and the second reflector 103 cause the two 1st-order diffracted lights $L_1$, $-L_1$ to be incident again on the composite diffraction grating 92 at an angle different from the angle (i.e., the diffraction angle) at which the two 1st-order diffracted lights $L_1$, $-L_1$ were transmitted through the composite diffraction grating 92.

Thus, the 2nd-order diffracted lights $L_2$, $-L_2$ having been transmitted through the composite diffraction grating 92 and diffracted again by the composite diffraction grating 92 are incident on the first mirror 14 or the second mirror 16 through an optical path different from the optical path through which the light L emitted from the light source 3 passes.

Since other aspects of the configuration of the displacement detecting device 91 are identical to those of the displacement detecting device 1 of the first embodiment, the description thereof will be omitted. The same advantages as those of the displacement detecting device 1 of the first embodiment can also be achieved by the displacement detecting device 91 having the aforesaid configuration.

7. Modifications of Diffraction Grating

Next, modifications of the composite diffraction grating will be described below with reference to FIGS. 14 and 15.

Figure 14:
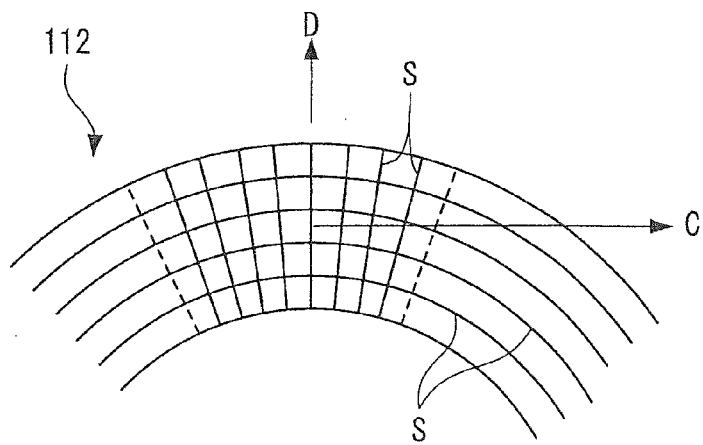
FIG. 14 is a view showing a first modification of the diffraction grating.

FIG. 14 is a view showing a first modification of the composite diffraction grating. FIG. 15 is a view showing a second modification of the composite diffraction grating.

A composite diffraction grating 112 shown in FIG. 14 has radially-extended slits s and concentrically-arranged substantially circular slits s formed therein. As a so-called rotary encoder, the composite diffraction grating 112 can perform position detection on a machine tool's rotating portion and the like. Further, with the composite diffraction grating 112, it is possible to measure eccentric component of the second grating vector direction D while detecting angular information.

In the composite diffraction grating 2 of the aforesaid embodiments, the first grating vector direction C and the second grating vector direction D are measuring directions, however the present invention is not limited thereto. For example, the present invention also includes a configuration in which the first grating vector direction C and the second grating vector direction D are not measuring directions, such as the case of a composite diffraction grating 122 according to a second modification shown in FIG. 15.

Figure 15:
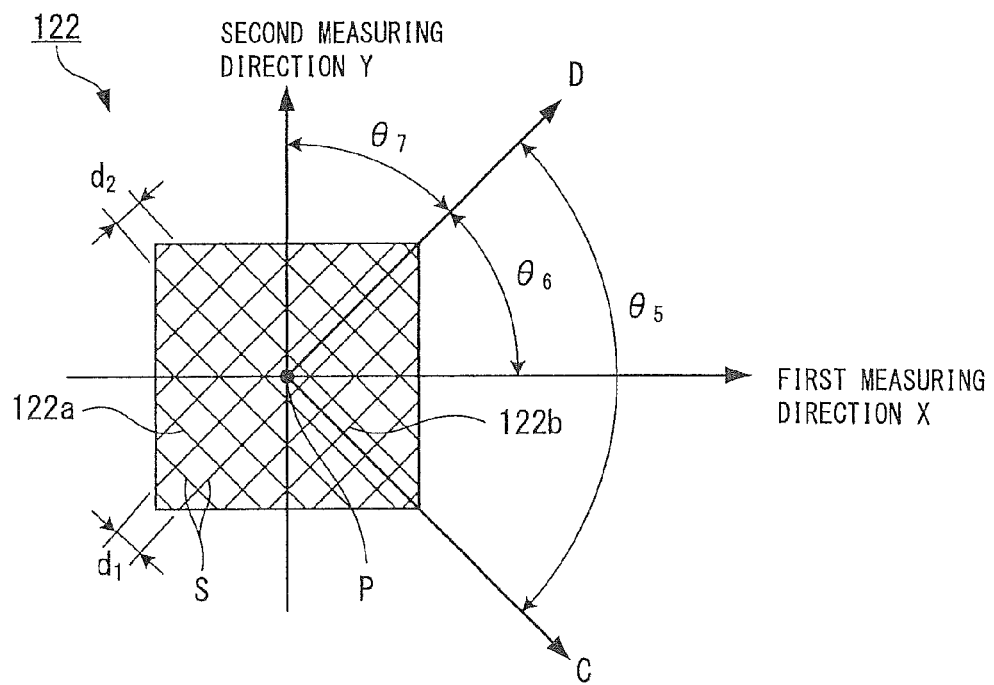
FIG. 15 is a view showing a second modification of the diffraction grating.

As shown in FIG. 15, the composite diffraction grating 122 includes a first diffraction grating 122a and a second diffraction grating 122b. The grating pitch Λa of the first diffraction grating 122a is set to $d_1$, and the grating pitch Λb of the second diffraction grating 122b is set to $d_2$.

Further, the second grating vector direction D of the second diffraction grating 122b is parallel to the surface of the composite diffraction grating 122 and inclined with respect to the first grating vector direction C of the first diffraction grating 122a by angle $\theta_5$. Further, the composite diffraction grating 122 is arranged so that the second grating vector direction D is inclined with respect to a first measuring direction X by angle $\theta_6$ and inclined with respect to a second measuring direction Y by angle $\theta_7$.

Here, in the case where angle $\theta_5$=90 degrees, $\theta_6$=$\theta_7$=45 degrees, the displacement of the first measuring direction X is obtained by multiplying the grating pitch Λa of the first diffraction grating 122a or the grating pitch Λb of the second diffraction grating 122b by $\sqrt{2}$. Incidentally, the displacement of the second measuring direction Y can be obtained in the same manner.

Thus, the first grating vector direction C and the second grating vector direction D may not be the first measuring direction X and the second measuring direction Y. In other words, the two-dimensional displacement can be detected based on the information from the grating pitch of the first diffraction grating 122a and the grating pitch of the second diffraction grating 122b.

Generally, the response speed of the displacement detection is limited due to the processing of the photoelectrically converted electrical signal. Thus, when moving speed is the same, the smaller the interval of the grating pitches of the diffraction grating is, the higher the frequency of the electrical signal will become. To deal with such problem, as the composite diffraction grating 122 shown in FIG. 15, the grating vector direction is inclined with respect to the measuring direction, so that frequency can be reduced particularly in the case where the speed is high.

As a result, under the condition that the moving speed in the same measuring direction is the same, it is possible to reduce the frequency of the electrical signal to $1/\sqrt{2}$ by employing the composite diffraction grating 122 shown in FIG. 15, compared with the composite diffraction grating in which the grating vector direction is the first measuring direction.

For example, in the case of a semiconductor exposure device having a wafer stage and a reticle stage, the reticle stage does not require as higher resolution than the wafer stage, however the reticle stage moves at a speed several times higher than the wafer stage. It is known that it is effective to apply the composite diffraction grating 122 shown in FIG. 15 to the reticle stage.

It is to be understood that the present invention is not limited to the embodiments described above and shown in the attached drawings, and various modifications can be made without departing from the spirit and scope of the present invention. Although the aforesaid embodiments are described using an example in which the two-dimensional displacement is detected using a composite diffraction grating (as the diffraction grating) having a first diffraction grating and a second diffraction grating and two grating interferometers, a displacement detecting device having one grating interferometer may also be used to detect one-dimensional displacement. In such a case, a diffraction grating having only one grating vector direction will be suffice as the diffraction grating.

Further, the light emitted from the light source may also be supplied through a liquid space or a vacuum space, instead of being supplied through a gas space. Furthermore, each of the light receiving elements of the light receiving section may also be arranged in separate position by using an optical fiber. With such an arrangement, the distance between the light receiving elements and telecommunication portion, such as the relative position information output section, can be reduced, and therefore response speed can be increased.

What is claimed is:

1. A displacement detecting device comprising:
a substantially plate-like diffraction grating adapted to diffract light;
a grating interferometer adapted to irradiate light on the diffraction grating where the irradiated light is diffracted into two beams of light and to cause the two beams of diffracted light to interfere with each other, and generate an interference signal; and
a relative position information output section adapted to detect relative position information of the diffraction grating based on the interference signal generated by the grating interferometer,
wherein the grating interferometer includes:
a light source adapted to irradiate light on the diffraction grating, perpendicular to the diffraction grating;
two reflectors adapted to reflect two one-time diffracted lights diffracted once by the diffraction grating, and cause the reflected one-time diffracted lights to be incident again on the diffraction grating at a position substantially identical to the point at which the light from the light source is irradiated, each reflector including a first mirror to reflect the one-time diffracted light diffracted once by the diffraction grating in a direction different from an incident direction of the one-time diffracted light and a second mirror to reflect the one-time diffracted light reflected by the first mirror toward the diffraction grating so as to be incident again on the diffraction grating at the position substantially identical to the point at which the light from the light source is irradiated, and the first mirror and the second mirror arranged such that the one-time diffracted light reflected by the second mirror toward the diffraction grating is incident on the diffraction grating at an angle different from both an incident angle of the light incident from the light source onto the diffraction grating and an angle at which the one-time diffracted light diffracted once by the diffraction grating is transmitted through or reflected away from the diffraction grating toward the first mirror, and thereby an optical path through which the one-time diffracted light reflected by the second mirror toward the diffraction grating passes is different from an optical path through which the one-time diffracted light diffracted once by the diffraction grating and reflected away from the diffraction grating toward the first mirror passes and an optical path through which the light incident from the light source onto the diffraction grating passes;
a beam splitter adapted to superimpose two two-time diffracted lights diffracted twice by the diffraction grating on each other; and
a receiver adapted to receive the two-time diffracted lights superimposed on each other by the beam splitter to generate the interference signal.

2. The displacement detecting device according to claim 1, wherein a lens is arranged between the diffraction grating and each reflector.

3. The displacement detecting device according to claim 1, wherein the diffraction grating is a composite diffraction grating which has:
a first diffraction grating; and
a second diffraction grating,
wherein the first diffraction grating is arranged along a first grating vector direction parallel to a surface onto which the light is irradiated, and the second diffraction grating is arranged along a second grating vector direction parallel to the surface, and inclined with respect to the first grating vector direction at a predetermined angle, and
wherein the grating interferometer includes:
a first grating interferometer adapted to generate an interference signal of the light diffracted by the first diffraction grating; and
a second grating interferometer adapted to generate an interference signal of the light diffracted by the second diffraction grating,
wherein the first grating interferometer and the second grating interferometer are arranged in such a manner that one of them is rotated relative to the other about a third direction so that the they form a predetermined angle with each other, wherein the third direction is a direction that passes through a point at which the light from the light source is irradiated and that is perpendicular to the surface.

4. The displacement detecting device according to claim 2, wherein the diffraction grating is a composite diffraction grating which has:
a first diffraction grating; and
a second diffraction grating,
wherein the first diffraction grating is arranged along a first grating vector direction parallel to a surface onto which the light is irradiated, and the second diffraction grating is arranged along a second grating vector direction parallel to the surface, and inclined with respect to the first grating vector direction at a predetermined angle, and
wherein the grating interferometer includes:
a first grating interferometer adapted to generate an interference signal of the light diffracted by the first diffraction grating; and
a second grating interferometer adapted to generate an interference signal of the light diffracted by the second diffraction grating,
wherein the first grating interferometer and the second grating interferometer are arranged in such a manner that one of them is rotated relative to the other about a third direction so that the they form a predetermined angle with each other, wherein the third direction is a direction that passes through a point at which the light from the light source is irradiated and that is perpendicular to the surface.

* * * * *